(12) United States Patent
Stenfelt

(10) Patent No.: US 9,674,096 B2
(45) Date of Patent: Jun. 6, 2017

(54) RATE ADAPTATION

(75) Inventor: John Stenfelt, Gothenburg (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 158 days.

(21) Appl. No.: 13/578,447

(22) PCT Filed: Feb. 12, 2010

(86) PCT No.: PCT/EP2010/051769
§ 371 (c)(1),
(2), (4) Date: Aug. 10, 2012

(87) PCT Pub. No.: WO2011/098134
PCT Pub. Date: Aug. 18, 2011

(65) Prior Publication Data
US 2012/0311102 A1 Dec. 6, 2012

(51) Int. Cl.
*G06F 15/16* (2006.01)
*H04L 12/813* (2013.01)
*H04L 12/801* (2013.01)
*H04L 12/851* (2013.01)
*H04L 12/863* (2013.01)

(52) U.S. Cl.
CPC .............. *H04L 47/20* (2013.01); *H04L 47/10* (2013.01); *H04L 47/193* (2013.01); *H04L 47/2433* (2013.01); *H04L 47/2441* (2013.01); *H04L 47/33* (2013.01); *H04L 47/39* (2013.01); *H04L 47/6215* (2013.01)

(58) Field of Classification Search
CPC ....... H04L 47/20; H04L 47/10; H04L 47/193; H04L 47/2433; H04L 47/2441; H04L 47/33; H04L 47/39; H04L 47/6215

USPC .......................................................... 709/219
See application file for complete search history.

(56) References Cited

U.S. PATENT DOCUMENTS 6,105,064 A * 8/2000 Davis et al. .................. 709/224
6,453,429 B1 * 9/2002 Sadana ......................... 714/43
(Continued)

FOREIGN PATENT DOCUMENTS

EP           2023245 A1 * 2/2009
WO      2009058067 A1    5/2009

*Primary Examiner* — Bryan Lee
*Assistant Examiner* — Oluwatosin Gidado
(74) *Attorney, Agent, or Firm* — Patents on Demand P.A.; Brian K. Buchheit; Scott M. Garrett

(57) ABSTRACT

The present solution relates a method in a first communication node (301) for rate adaptation of communication between the first communication node (301) and at least one second communication node (302). The first communication node (301) and the at least one second communication node (302) being comprised in a communication network (300). The first communication node (301) receives a message from the second communication node (302). The message comprises a communication window size of the second communication node (302). The communication window size of the second communication node (302) is stored. Then, the first communication node (301) obtains the communication window size of the first communication node (301), i.e. its own communication window size. The first communication node (301) transmits a message to the second communication node (302). The message comprises the obtained communication window size of the first communication node (301).

12 Claims, 10 Drawing Sheets

(56) References Cited

U.S. PATENT DOCUMENTS

| | | | |
|---|---|---|---|
| 6,594,701 B1 | 7/2003 | Forin | |
| 2002/0004842 A1* | 1/2002 | Ghose et al. | 709/235 |
| 2002/0131413 A1* | 9/2002 | Tsao et al. | 370/392 |
| 2005/0088972 A1* | 4/2005 | Zhang | H04L 47/10 370/235 |
| 2008/0294784 A1* | 11/2008 | Wang | 709/228 |
| 2009/0083861 A1* | 3/2009 | Jones | 726/29 |
| 2010/0235519 A1* | 9/2010 | Hu | H04L 12/14 709/227 |
| 2011/0040845 A1* | 2/2011 | Cai et al. | 709/206 |
| 2012/0275336 A1* | 11/2012 | Wise et al. | 370/252 |

\* cited by examiner

RATE ADAPTATION

CROSS-REFERENCE TO RELATED APPLICATION

This application is a 35 U.S.C. §371 National Phase Entry Application from PCT/EP2010/051769, filed Feb. 12, 2010, and designating the United States, the disclosure of which is incorporated herein by reference.

TECHNICAL FIELD

This solution relates generally to a first communication node and a method in the first communication node, and a second communication node and a method in the second communication node. More particularly this solution relates to rate adaptation of communication between the first communication node and the second communication node,

BACKGROUND

The Diameter Base Protocol constitutes a framework for various applications for Authentication, Authorization and Accounting (AAA). The base protocol itself specifies the message format, transport property and functionality, basic error reporting, and security related functions to be used by all Diameter applications.

Diameter applications, both those defined by Internet Engineering Task Force (IETF) such as Diameter Credit Control Application (DCCA) or those that are vendor specific such as Third Generation Partnership Project (3GPP) Gx, are constructed on top of the base protocol and inherit its parameters and capabilities in a very object oriented kind of way. It might be because of its flexibility and easy reuse that Diameter has become very popular in 3GPP, where Diameter based applications are now used on numerous interfaces such as e.g. the Gx, Gxx, S6a, S6d, Rx, Cx and Sh.

The network elements that implements Diameter may act in one out of three defined roles: Client, Server or Agent. The agent role may in addition be separated into relay, proxy, redirect and translation agents.

A Diameter transport connection is defined between two Diameter nodes, server 103 and client 101, and is called a peer, as illustrated in FIG. 1. Diameter peers are connection oriented and may utilize either Transport Control Protocol (TCP) or Stream Control Transmission Protocol (SCTP) as an underlying transport protocol. The base protocol defines well defined mechanisms for peer establishment, maintenance and tear down.

In Diameter, a client who wishes to request services from a Diameter server may contact the server directly by using an already existing peer, or it may set up a new Diameter peer towards the server. A prerequisite for this is of course that it knows the destination-host Fully Qualified Domain Name (FQDN) and Internet Protocol (IP) address of the server. The later may of course be obtained via Domain Name System (DNS) if only the FQDN is known. In case there is no existing direct peer available to a server 103, the client 101 may route requests via an agent 102 in the destination realm. For certain types of agents 102, e.g. Relay agent, the agent 102 will forward the request to a server 103 in the destination realm. Similarly, the response message will also be sent via the agent 102 back to the client 101.

Depending on the network configuration, the client may attempt to establish a new peer connection directly towards the server, e.g. by looking up the destination host IP address via DNS, since it now knows which server the Diameter session is handled by, or it may continue to send successive requests via the agent for the lifetime of the Diameter Session. It is important to notice that the Diameter Session spans multiple peer connection in this case.

The Diameter Base Protocol was designed to be a generic AAA-protocol and it was therefore based on the assumption that its intentional use would be similar to that of its precursors e.g. Remote Authentication Dial-In User Services (RADIUS). As such it still has an air of "Dial-up-Internet" inherited in its design, i.e. application level messages are not expected to be very frequent and the protocol has not been optimized, although this is of course supported, for multiple simultaneous Diameter sessions between a client/server pair.

This may be exemplified by the recommendation in the Request For Comments (RFC) 3588 to set the default Peer watchdog timer to e.g. 30 seconds and not to set this value lower than e.g. 6 seconds. In case no message is received on a peer before this timer expires then a watchdog request, i.e. a "heartbeat" message, is sent to check the availability of the peer connection. If no response is received for this message before the timer expires again, the peer is deemed to be failed.

Considering Diameter "super" applications such as 3GPP Gx and 3GPP Gy where parallel sessions may exist between any given client in the order of millions of concurrent sessions, and the message exchange may be as frequent as thousands of requests per seconds. In such applications, it is obvious that if no response message is received even for a very short timeframe such as a couple of milliseconds, then the peer is most probably experiencing some form of connection problem. Thus the recommendations in RFC3588 do not apply for e.g. 3GPP Gx and 3GPP Gy deployments. In this scenario the client may be e.g. a Gateway GPRS Support Node (GGSN), Bearer Binding and Event Reporting Function (BBERF) or Packet Data Network-Gateway (PDN-GW) and the server may be e.g. a Policy and Charging Rules Function (PCRF) or Online Charging System (OCS).

A serious problem with the Diameter base protocol emerges when such super applications are used in a scenario where a relay or proxy agent is placed between clients and servers. For this scenario there is no rate control between the client and the server.

The transport level flow control of TCP and SCTP can not be used as they exist per peer and not per session. Further on link level, load should never be a limiting factor in 3GPP Diameter networks. The reason for this is that capacity in Operation & Maintenance (O&M) networks is usually not a problem and the traffic characteristic is signaling. Signaling traffic is relatively light, i.e. the arrival process is Poisson, without the heavy tailed distributions of e.g. Internet traffic.

As different network elements, i.e. clients and servers, have different capacity with regard to signaling, i.e. the number of messages per second, and as transport network capacity is not a problem and there is no mechanism for congestion avoidance on a per client server pair, there is an evident risk that a Diameter client or server may drown the other end with requests in situations of intense signaling.

FIG. 2 displays a scenario where this might happen. The example is based on 3GPP Gx where the Gx server 201, i.e. the PCRF, has a much higher signaling capacity than the Gx client 202, i.e. the PCEF. The client 202 and the server 201 are connected with gigabit Ethernet Network Interface Cards (NIC) via an agent 203 in this example. The example scenario in FIG. 2 shows a 3GPP Gx client 202 (PCEF) and 3GPP Gx server 201 (PCRF) with one million simultaneous Gx sessions connected via an agent 203. The Gx client 202 may handle e.g. 1000 messages per second and the Gx server 201 e.g. 10000 requests per second.

During signaling peaks, e.g. during busy hour when the number of server initiated Gx requests are high, the PCRF may unintentionally issue more requests to a Policy Control and Charging Enforcement Function (PCEF) than it can handle, which will cause buffer overflow or node outage. This will result in Gx requests being dropped. As there is no retransmission mechanism defined for Gx, the associated calls will probably be lost.

This is particularly a disadvantage in a case where there are certain requests that the Gx server, in this example, would like to prioritize, e.g. requests associated with emergency and priority services. As the Gx server has no idea of how many requests that it may safely issue, it can not efficiently do the prioritization in an adequate way. During certain situations, e.g. new years eve or in a disaster situation, when network signaling load reach levels that are far beyond what is normal there will be no way to guarantee emergency and priority requests to get through, even for busy hour.

This problem has been recognized within 3GPP and will be part of a new work item for Rel-10 that was recently approved for Enhanced Multimedia Priority Services. The Enhanced Multimedia Priority Services will cover functionality for prioritized signaling traffic, among other things.

For clients and servers that are connected with a direct peer connection it is possible to reuse the flow control mechanisms of the transport layer, i.e. TCP or SCTP, to regulate the request rate of the adjacent peer. However such an approach would imply layer violation between transport layer and application layer, or a Congestion Manager, which would require a special Application Programming Interface (API) to be implemented.

SUMMARY

It is thus an object of the present solution to provide a mechanism for reducing communication congestion in a communication network.

According to a first aspect of the solution, the objective is achieved by a method in a first communication node for rate adaptation of communication between the first communication node and at least one second communication node. The first communication node and the at least one second communication node being comprised in a communication network. The first communication node receives a message from the second communication node. The message comprises a communication window size of the second communication node. The communication window size of the second communication node is stored. Then, the first communication node obtains the communication window size of the first communication node, i.e. its own communication window size. The first communication node transmits a message to the second communication node. The message comprises the obtained communication window size of the first communication node.

According to a second aspect of the solution, the objective is achieved by a method in a second communication node for rate adaptation of communication between the second communication node and at least one first communication node. The first communication node and the second communication node being comprised in a communication network. The second communication node detects a trigger to send a message to the first communication node. The message comprises a communication window size of the second communication node. The second communication node obtains the communication window size of the second communication node, i.e. its own communication window size. The second communication node transmits the message to the first communication node. The message comprises the communication window size of the second communication node. Then, the second communication node receives a message from the first communication node. The received message comprises the communication window size of the first communication node. The second communication node stores the received communication window size of the first communication node.

According to a third aspect of the solution, the objective is achieved by a first communication node for rate adaptation of communication between the first communication node and at least one second communication node. The first communication node and the at least one second communication node being comprised in a communication network. The first communication node comprises a receiver configured to receive a message from the second communication node. The message comprises a communication window size of the second communication node. The first communication node further comprises a storage unit which is configured to store the communication window size of the second communication node. Even further, the first communication node comprises an obtaining unit configured to obtain the communication window size of the first communication node, and a transmitter configured to transmit a message to the second communication node. The message comprises the obtained communication window size of the first communication node.

According to a fourth aspect of the solution, the objective is achieved by a second communication node for rate adaptation of communication between the second communication node and at least one first communication node. The first communication node and the second communication node being comprised in a communication network. The second communication node comprises a detector which is configured to detect a trigger to send a message to the first communication node. The message comprises a communication window size of the second communication node. The second communication node comprises an obtaining unit configured to obtain the communication window size of the second communication node. Further, the second communication node comprises a transmitter which is configured to transmit the message to the first communication node. The message comprises the communication window size of the second communication node. The second communication node further comprises a receiver which is configured to receive a message from the first communication node. The received message comprises the communication window size of the first communication node. Even further, the second communication node comprises a storage unit configured to store the received communication window size of the first communication node.

Thanks to the communication window size, the communication nodes in the network knows the maximum number of outstanding messages that can be received in the other nodes in the network, and thus reduce congestion of signalling and/or communication in the network.

The present technology affords many advantages, for which a non-exhaustive list of examples follows:

The proposed solution provides a mean for efficient end-to-end rate control of AAA requests based on admission of signaling resources. In combination with priority scheduling of outgoing requests any AAA node that deploys this mechanism will be able to provide reliable signaling for priority services even in times of heavy congestion.

The proposed solution may be applied to any AAA applications either as an optional add-on to existing AAA applications, or to a stand-alone maintenance application. The two alternatives of the solution, i.e. piggy back announced window size into existing messages or to deploy a dedicated maintenance application, captures a wide range of possible implementations.

Another advantage of the present solution is that it increases the reliability of safe receipt of messages, and reduces the risk of congestion or choking nodes in the network.

Enhanced Multimedia Priority Services will be standardized for 3GPP Rel-10 and one of the target functions is prioritized signaling traffic. As such, the proposed solution is suitable for standardization.

The present solution is not limited to the features and advantages mentioned above. A person skilled in the art will recognize additional features and advantages upon reading the following detailed description.

BRIEF DESCRIPTION OF THE DRAWINGS

The solution will now be further described in more detail in the following detailed description by reference to the appended drawings illustrating embodiments of the solution, and in which.

The drawings are not necessarily to scale, emphasize is instead being placed upon illustrating the principle of the invention.

DETAILED DESCRIPTION

The basic principle of the solution is that each Authentication, Authorization and Accounting (AAA) client announces and updates, whenever required to do so, a communication window size to all servers for which it has ongoing AAA Sessions established with. These communication window sizes define the maximum number of outstanding AAA application requests that the server may safely issue towards the client without choking/congesting the client. Similarly, all servers announce a request window size to all its clients that it has Diameter sessions established with. The clients should also limit the number of outstanding requests towards the server accordingly. An example of an AM protocol that can be used is the Diameter protocol. In the following description, the Diameter protocol will be used as an example, but a person skilled in the art will understand that any AAA protocol can be used.

Figure 1:
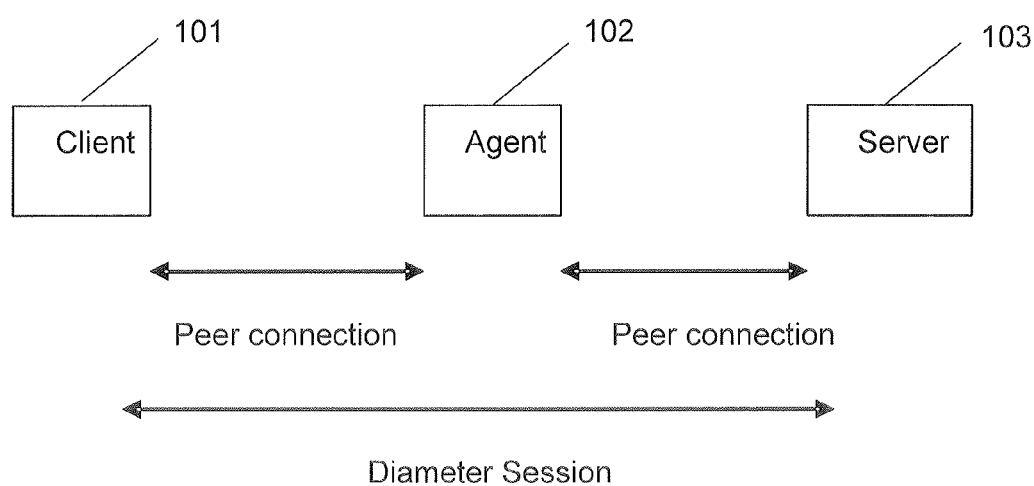
FIG. 1 is a schematic block diagram illustrating a diameter connection.
Figure 2:
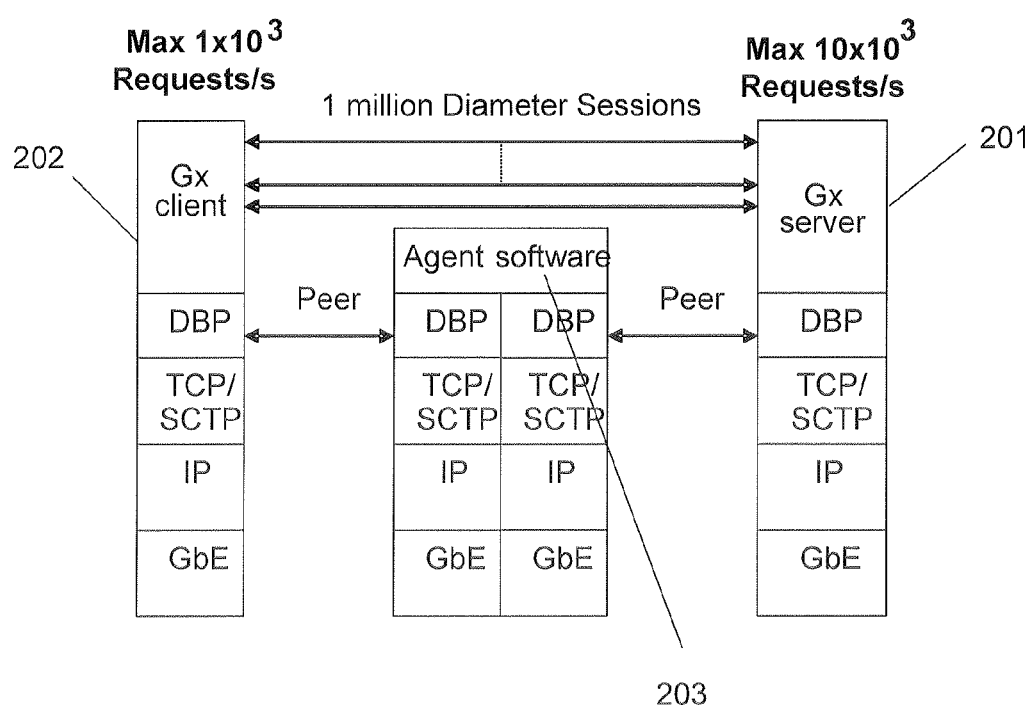
FIG. 2 is a schematic block diagram illustrating embodiments of diameter sessions.
Figure 3:
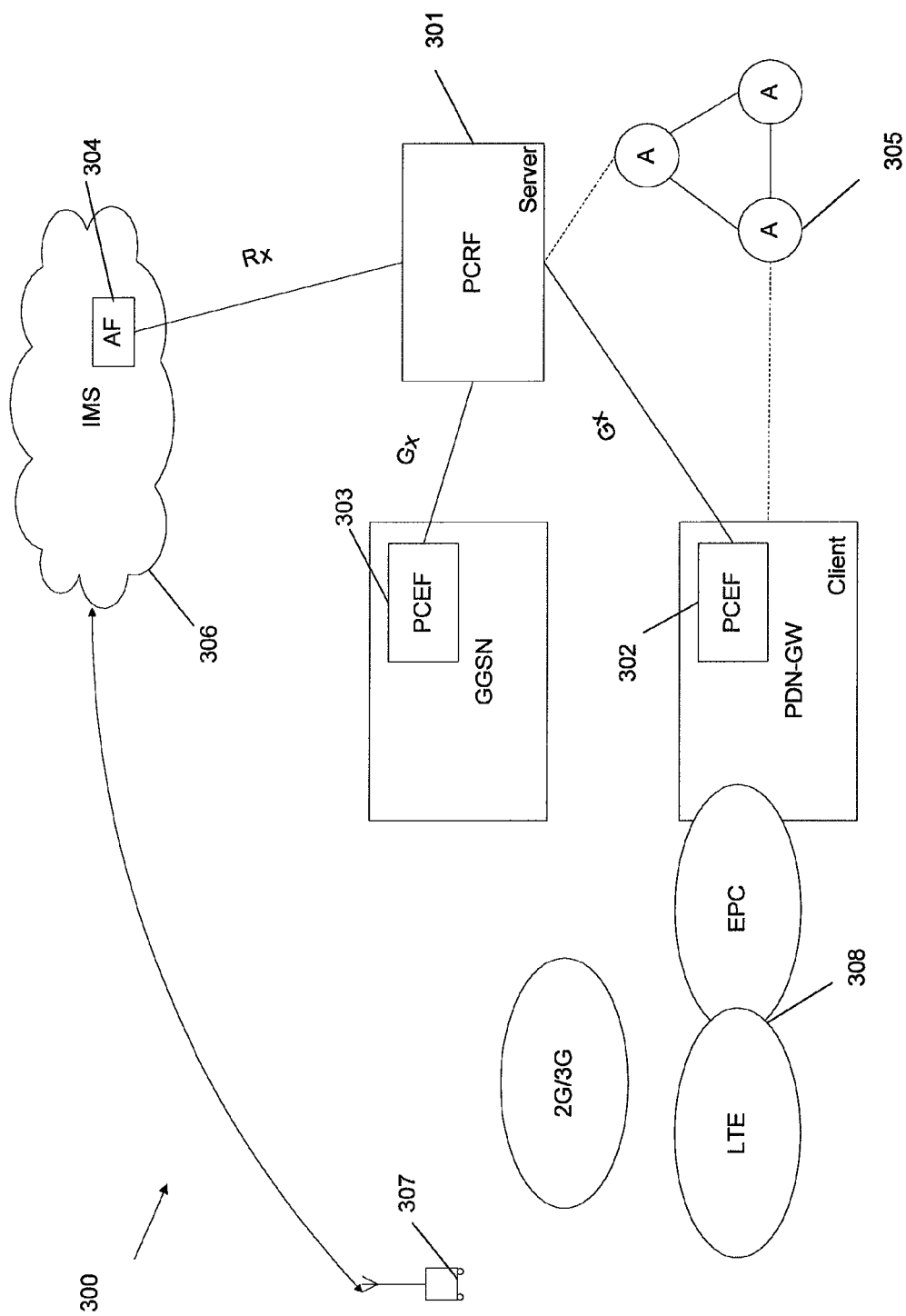
FIG. 3 is a schematic block diagram illustrating embodiments of a communication network.

FIG. 3 is a simplified illustration of embodiments of a communication network 300. The communication network 300 is a telecommunications network using wireless and/or wired communication techniques. The figure illustrates a communication network 300 in the form of an Evolved Packet System (EPS) using Long Term Evolution (LTE) 308. However, a person skilled in the art will understand that this could also apply for communication networks using other types of technology, such as e.g. Worldwide Interoperability for Microwave Access (WiMAX), Universal Mobile Telecommunications System (UMTS) etc. It should be noted that the communication links in the communication network 300 may be of any suitable kind including either wired or wireless links. The links may use any suitable protocol depending on type and level of layer, e.g. as indicated by the Open System Interconnection (OSI) model, as understood by the person skilled in the art. A user equipment 307 is connected to a IP Multimedia Subsystem (IMS) 306. The user equipment 307 may be any suitable communication device or computational device with communication capabilities, for instance but not limited to mobile phone, smart phone, personal digital assistant (PDA), laptop, Moving Picture Experts Group Layer-3 Audio (MP3) player or portable Digital Versatile Disc (DVD) player, or similar media content devices, digital camera, or even stationary devices such as a Personal Computer (PC). A PC may also be connected via a mobile station as the end station of the broadcasted/multicasted media. The IMS 306 comprises an application function (AF) 304 which could be a service controlling function or a session controlling function. The AF 304 is connected via e.g. the interface Rx, to a Policy and Charging Rules Function (PCRF) 301. The PCRF may act as a server in the communication network 300. The PCRF may be connected via e.g. the interface Gx to Policy and Charging Enforcement Function (PCEF) functions. The PCEF functions 302, 303 may be comprised in e.g. a or Packet Data Network-Gateway (PDN-GW) and a Gateway General Packet Radio Service (GPRS) Support Node (GGSN). In this embodiment, the PDN-GW may act as a client in the communication network 300. The Policy and Charging functions are referred to as "functions" because the functions may be implemented in different ways, e.g. as a stand-alone product or included in a network element. At least one agent (A) 350 may be connected between the PCEF 302 and the PCRF 301.

It should be appreciated that the network 300 is configured with cabling, routers, switches, and other network building elements (not shown) as understood by the skilled person, for instance as used for building an Ethernet or WAN network.

Figure 4:
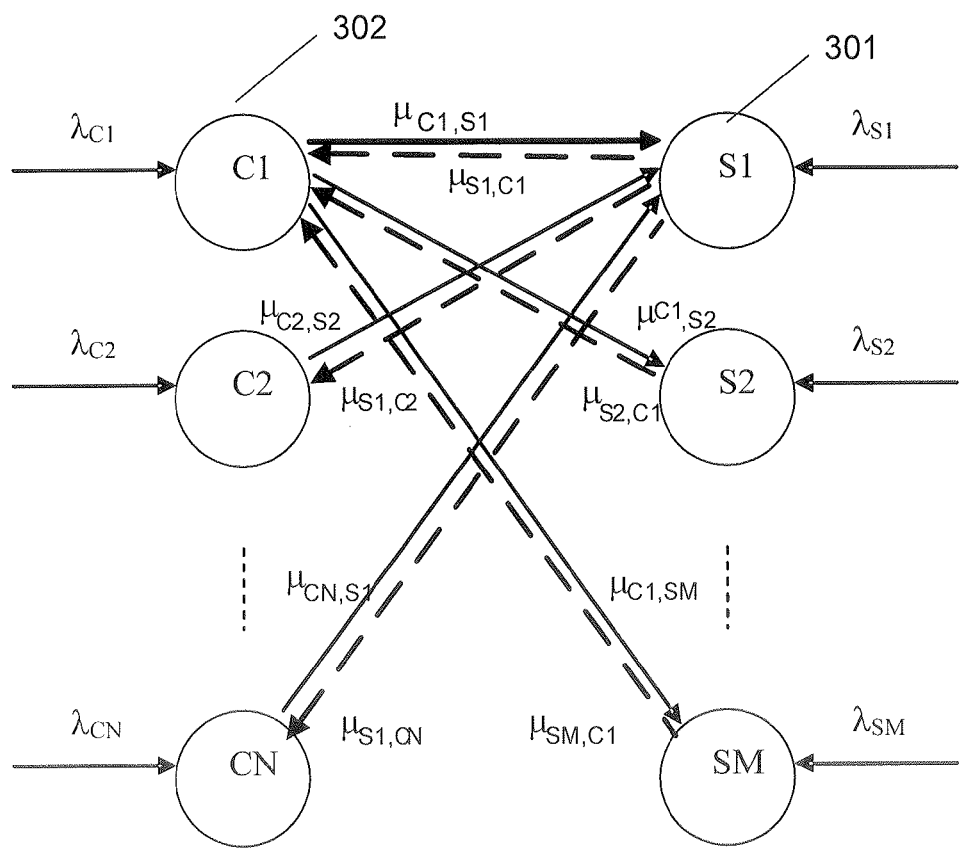
FIG. 4 is a schematic block diagram illustrating a number of clients interconnected with a number of servers.

FIG. 4 is a generic network picture of N number of clients 302 interconnected with M number of servers 301. The thick solid lines depict communication from a client 302 to a server 301, and the dotted lines depict communication from a server 301 to a client 302.

$\lambda_{Cx}$ Denotes the arrival intensity of events that cause a request at client x.

$\lambda_{Sx}$ Denotes the arrival intensity of events that cause a request at server x.

$\lambda_{Cx,Sy}$ Denotes the arrival intensity of events that cause a request towards server y at client x.

$\lambda_{Sx,Cy}$ Denotes the arrival intensity of events that cause a request towards client y at server x.

$\mu_{Cx}$ Denotes the capacity of client x in No. requests per second.

$\mu_{Sx}$ Denotes the capacity of server x in No. requests per second.

$W_{Cx,Sy}$ Denotes the announced window size in No. requests per second from client x to server y.

$W_{Sx,Cy}$ Denotes the announced window size in No. requests per second from server x to client y.

For guaranteed reliability the total announced communication window size should not exceed the capacity of the client/server i.e.

$$\Sigma_{i=1} \ldots M \, W_{Cx,Si} \leq \mu_{Cx}$$

$$\Sigma_{i=1} \ldots N \, W_{Si,Cx} \leq \mu_{Sx}$$

However, if 100% reliability is not required then a certain degree of over allocation may be acceptable.

The principle/algorithm used to calculate the announced request window size may be arbitrary. There are numerous principles for scheduling existing today that may be applied and that may involve parameters such as:

The capacity of the Diameter node, i.e. $\mu_{Cx}$ and $\mu_{Sx}$.

The number of clients/server that the server/client has active Diameter sessions established with, i.e. N and M in FIG. 4.

The request arrival rate from the different clients and servers, i.e. $\lambda_{Cx}$ and $\lambda_{Sx}$.

The latest registered announced request window size from the clients/servers that the server/client has active Diameter sessions established with, i.e. $W_{Cx,Sy}$ and $W_{Sx,Cy}$.

The clients and servers may announce a new window size at any time due to e.g. a change in any of the above mentioned parameters.

By applying this principle in a Diameter network each Diameter node knows how many application requests that it may safely issue towards any other node. With this knowledge each Diameter node may apply priority scheduling on outgoing requests, based on e.g. Address Resolution Protocol (ARP) in Third Generation Partnership Project (3GPP) networks or other priority indicators, in a way so that at times when the number of required requests per second towards a certain Diameter client or server, i.e. $\lambda_{Cx,Sy}$ or $\lambda_{Sx,Cy}$, exceed the negotiated window size, then high priority requests, i.e. requests related to an emergency or priority call, would still be able to be served.

The principle/algorithm used for priority scheduling may be arbitrary. There exist numerous scheduling principles that may be applied for this purpose.

In an embodiment of the solution a PCEF 302 communicates with a PCRF 301 through the 3GPP Gx application via a directly connected peer. This example supports IMS 306 and the PCRF 301 thus supports to interact with a Proxy Call Session Control Function (P-CSCF) Application Function (AF) 304 via the 3GPP Rx application. The implementation is here exemplified only for the Gx interface. The system elements in this example may have the following signaling capacity for Gx-signaling:

The capacity of the PCEF may be 3000 requests/second.
The capacity of the PCRF may be 7000 requests/second.

In this embodiment of the solution the announced window size may be piggy-backed or appended on existing Gx messages associated with existing PDN-connections. Thus, no dedicated signaling may be required to carry the information.

The example mechanism for determining the announced window size from any client/server to any server/client in this embodiment may be calculated as the total capacity divided by the number of clients/servers. As it has already been mentioned earlier, this mechanism may be arbitrary.

In this embodiment of the solution, the PCRF 301 applies a classed based scheduling mechanism with multiple outgoing queues for prioritization of Gx Reauthorization Request (RAR) messages. The exact mechanism implemented by the scheduler may be arbitrary.

The classification of outgoing requests may be based on Gx and Rx session related parameter, e.g. it could be any of or a combination of the following information: The Access Point Name (APN), which may be an emergency or priority APN, the subscribed Allocation/Retention Priority (ARP), International Mobile Subscriber Identity (IMSI), Internet Protocol (IP) address and Rx priority. The classification method may be chosen among any of the existing classification methods.

Similarly, the PCEF 302 applies a classed based scheduling mechanism with multiple outgoing queues for prioritization of Gx Credit Control Requests (CCR) messages. Just as for the PCRF, the classification process may be arbitrary.

Figure 5:
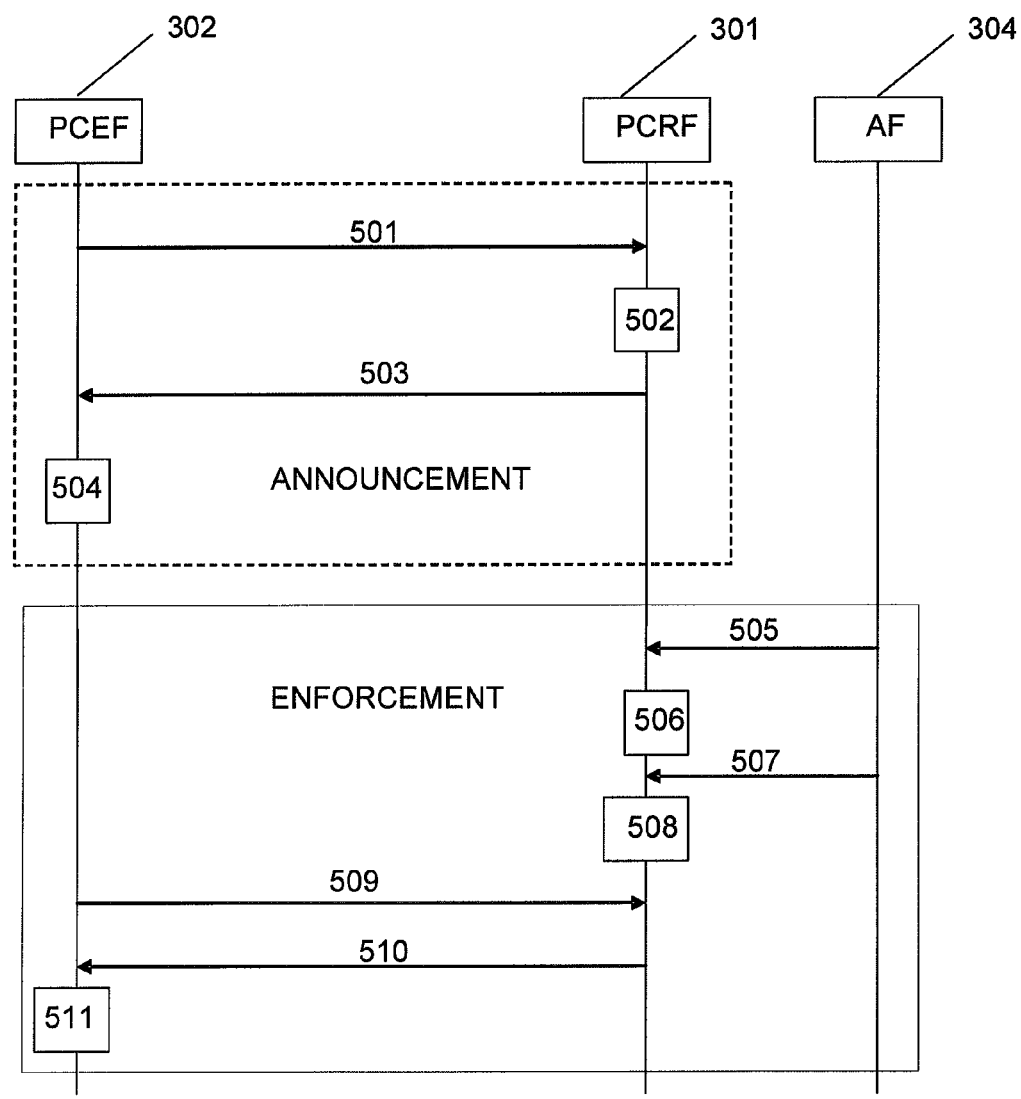
FIG. 5 is a combined schematic block diagram and flowchart depicting embodiments of a method.

FIG. 5 is a combined schematic block diagram and flowchart depicting embodiments of a method illustrating the case of a single PCRF 301, piggy backed information and directly connected peer.

Step 501

An event occurs at the PCEF 302 that triggers a Gx request, CCR, towards a certain PCRF 301 host. The triggering event may be e.g. an incoming request for a new PDN-connection, an incoming request for an update of an existing PDN-connection or a PCEF internal event that triggers an update of an existing Gx session. The PCEF 302 issues a Gx request and includes its announced communication window size, $W_{PCEF,PCRF}$, for this particular PCRF 301. As there is only one single PCRF 301 in this example $W_{PCEF,PCRF}=3000$.

Step 502

The target PCRF 301 stores the announced window size received from the PCEF 302.

Step 503

The PCRF 301 answers the PCEF request and includes its own announced communication window size. The communication window size of the PCRF 301 may be e.g. 7000 requests/second in the response message, Credit Control Answer (CCA).

Step 504

The PCEF 302 reads the announced window size of the PCRF 301 and stores this value. This completes the announcement part of this embodiment.

Step 505

An Rx request is received by the PCRF 301 that requires a corresponding Gx request to be issued towards the PCEF 302.

Step 506

The Rx and Gx sessions are associated with non-emergency/priority APN and the Rx contains no other information that indicates any high priority. The Gx request may be classified with normal priority. The number of outstanding Gx requests towards the PCEF 302 may however currently be e.g. 3000, i.e. max, and the Gx request may not be issued immediately, and may therefore be placed last in the priority queue with normal priority.

Step 507

Another Rx request is received by the PCRF 301, associated with another Rx session than the one in step 505, which requires a corresponding Gx request to be issued towards the PCEF 302.

Step 508

The Rx and Gx sessions are associated with an emergency/priority APN and/or the Rx contains information that indicates high priority. The Gx request may be classified with high priority. The number of outstanding Gx requests towards the PCEF 302 may however still be e.g. max 3000, and the Gx request may not be issued immediately and may therefore be placed in the priority queue with high priority, which may currently be empty.

Step 509

A Gx response, i.e. Resource Allocation Answer (RAA) for a Gx session is received from the PCEF 302. The number of outstanding requests may now be e.g. 2999, i.e. max−1.

Step 510

The PCRF 301 has several Gx requests awaiting scheduling in its buffers. The request with high priority from step 507 is scheduled prior to the request received in step 505, i.e. strict priority scheduling may be applied. A Gx RAR may be sent for the high priority request.

Step 511

The high priority Gx request, i.e. RAR, is successfully received by the PCEF 302.

In another embodiment of the present solution one PCEF 302 communicates with two PCRFs 301, 308 through the 3GPP Gx application via a Diameter proxy-agent 305. The use of agents is transparent for the illustration of this embodiment. This example supports IMS 306 and the PCRF 301, 308, and thus supports to interact with a P-CSCF (AF) 304 via the 3GPP Rx application. The implementation is here exemplified only for the Gx interface. The system elements in this example may have the following signaling capacity for Gx-signaling:

The capacity of the PCEF may be 5000 requests/second
The capacity of PCRF1 301 may be 2000 requests/second
The capacity of PCRF1 308 may be 3000 requests/second In this embodiment of the solution the announced communication window size may be announced using a dedicated Diameter application for application level feedback and e.g. parameter negotiation between clients and servers. Thus only one single session between any client and server would be needed for this purpose. Such an application would be independent from all existing Diameter applications. Consequently, this method would be suitable for use with Diameter applications that are already in deployment. No information is piggybacked on existing signaling in this embodiment. Including new Attribute Value Pairs (AVPs) into existing Diameter applications requires an application update if the AVP is optional and a new application ID if any of the AVPs are mandatory, i.e. M-bit may be set in the AVP header. To deploy this solution in e.g. all 3GPP Diameter application using the piggybacking mechanism exemplified above will require additions to all affected applications.

The example mechanism for determining the announced window size from any client/server to any server/client may in this embodiment be calculated as the total capacity divided by the number of clients/servers. As it has already been mentioned above this mechanism may be arbitrary, i.e. the actual algorithm for this may be more advanced.

In this embodiment of the solution the PCEF and PCRF applies a classed based scheduling mechanism with multiple outgoing queues for prioritization of Gx CCR and RAR messages. The exact mechanism implemented by the scheduler may be arbitrary.

The classification of outgoing requests may based on Gx and Rx session related parameter e.g. it could be any of or a combination of the following information: The APN, which may be an emergency or priority APN, the subscribed ARP, IMSI, IP-address and Rx priority.

Similarly, the PCEF applies a classed based scheduling mechanism with multiple outgoing queues for prioritization of Gx CCR messages.

Figure 6:
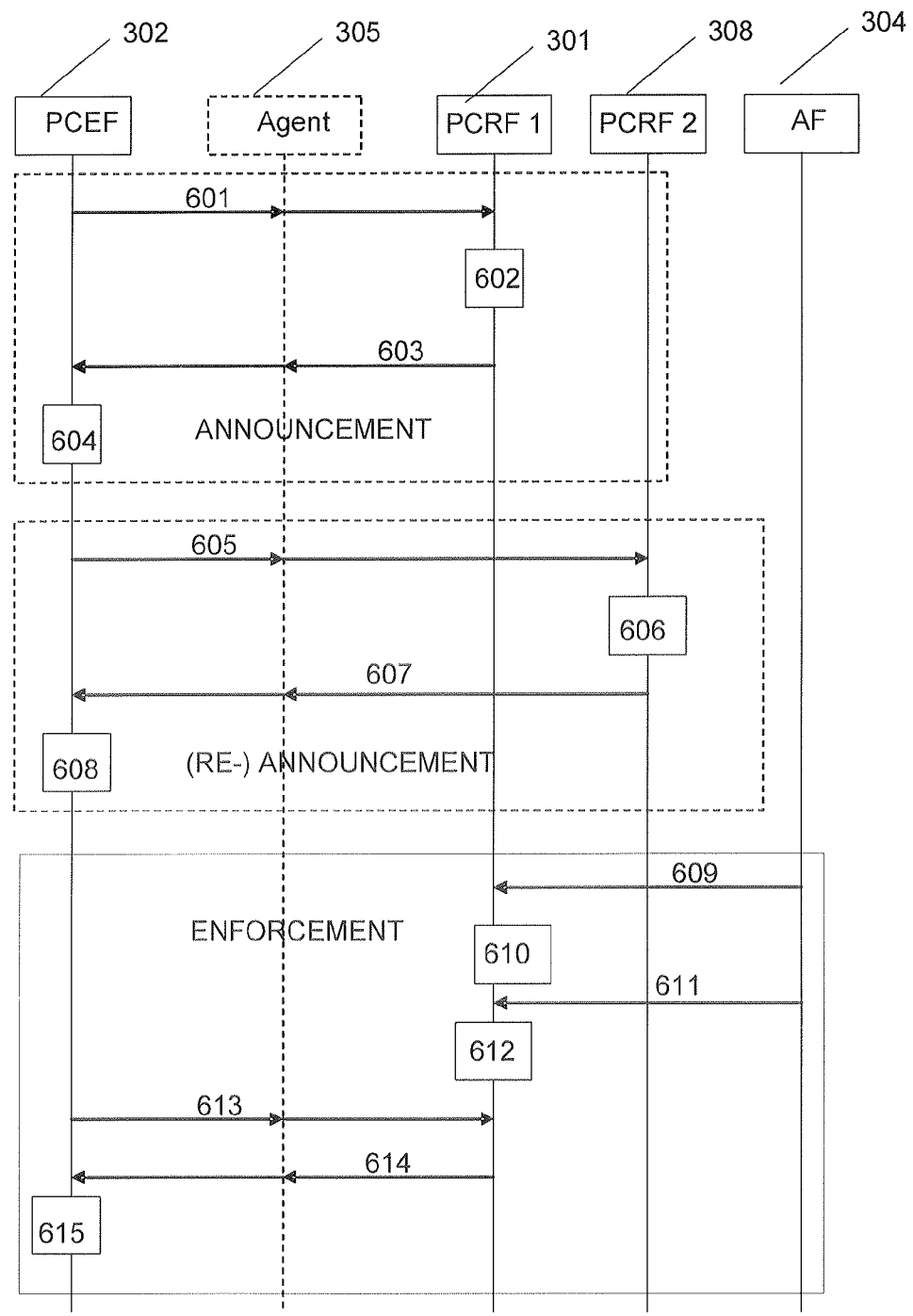
FIG. 6 is a combined schematic block diagram and flowchart depicting embodiments of a method.

FIG. 6 illustrates the case with multiple PCRF 301, 308, special maintenance application 304 and an agent 305 in between.

Note that steps 609-615 are the same as steps 507-511 in the example realization shown in FIG. 5.

Step 601

The PCEF 302 decides to issue a request using the Diameter maintenance application 304 towards PCRF1 301. The trigger for the request may be that it may be a new PCRF that the PCEF 302 needs to communicate with i.e. a Gx session has started on a new PCRF that the PCEF 302 has not communicated with until now, or the PCEF 302 wishes to announce an updated window size for some reason. The PCEF 302 issues the request and includes its announced window size for PCRF1 301. As there are two PCRFs in this example, the announced window size may be set to e.g. 2500. The request may be forwarded/relayed/proxied via a forwarding agent 305. The agent 305 forwards the request to PCRF1 301.

Step 602

The target PCRF1 301 stores the announced window size from the PCEF 302.

Step 603

The PCRF1 301 answers the PCEF 302 request and includes it own announced window size, e.g. 2000 requests/second.

Step 604

The PCEF 302 reads the announced window size of the PCRF1 301 and stores this value. This completes the announcement part for PCRF1 301 of this embodiment.

Step 605

The PCEF 302 decides to issue a request using the Diameter maintenance application 304 towards PCRF2, e.g. due to the newly announced window size towards PCRF1 the announced window size for PCRF1 308 may have to be adjusted. The PCEF 302 issues the request and includes its announced window size for PCRF2 308. The announced window size may be set to e.g. 2500. The request may be forwarded/relayed/proxied via a forwarding agent 305. The agent 305 forwards the request to PCRF2 308.

Step 606

The target PCRF1 308 stores the announced window size from the PCEF 302.

Step 607

The PCRF1 308 answers the PCEF 302 request and includes its own announced window size, e.g. 3000 requests/second.

Step 608

The PCEF 302 reads the announced window size of the PCRF1 308 and stores this value. This completes the announcement part for PCRF1 308 of this embodiment.

Step 609

An Rx request is received by the PCRF1 301 that requires a corresponding Gx request to be issued towards the PCEF 302.

Step 610

The Rx and Gx sessions are associated with non-emergency/priority APN and the Rx contains no other information that indicates high priority. The Gx request may be classified with normal priority. The number of outstanding Gx requests towards the PCEF may however currently be e.g. 2500, i.e. max, and the Gx request may not be issued immediately. It may therefore be placed in last in the priority queue with normal priority.

Step 611

Another Rx request is received by the PCRF1 301, associated with another Rx session than the one in step 609, which requires a corresponding Gx request to be issued towards the PCEF 302.

Step 612

The Rx and Gx sessions are associated with an emergency/priority APN and/or the Rx contains information that indicates high priority. The Gx request is classified with high priority. The number of outstanding Gx requests towards the PCEF may however still be e.g. 2500, i.e. max, and the Gx request may not be issued immediately and is therefore placed in the priority queue with high priority, which is currently empty.

Step 613

A Gx response (RAA) for a Gx session is received from the PCEF 302. The number of outstanding requests may now be e.g. 2499, i.e. max−1.

Step 614

The PCRF1 301 has several Gx requests awaiting scheduling in its buffers. The request with high priority from step 611 is scheduled prior to the request received in step 609, i.e. strict priority scheduling is applied.

Step 615

The high priority Gx request is successfully received by the PCEF 302.

Figure 7:
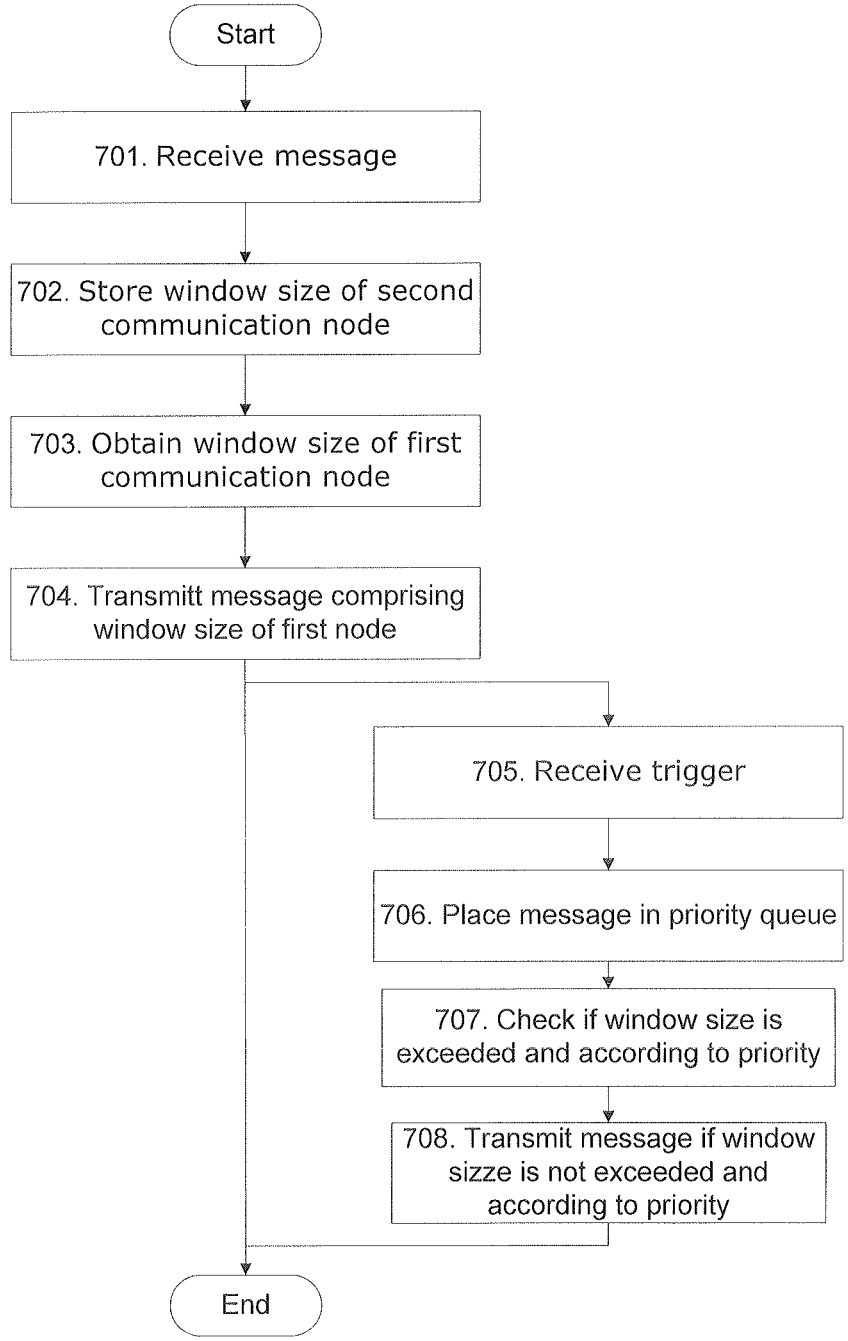
FIG. 7 is a flowchart depicting embodiments of a method in a communication network.

The method described above will now be described seen from the perspective of a first communication node 301. FIG. 7 is a flowchart describing the present method in the first communication node 301, for rate adaptation of communication between the first communication node 301 and at least one second communication node 302. The communication between the first communication node 301 and the second communication node 302 may be based on an AAA-protocol. The first communication node 301 and the at least one second communication node 302 being comprised in a communication network 300.

The first communication node 301 may be a server and the at least one second communication node 302 may be a client, or the second communication node 302 may be a server and the at least one first communication node 301 may be a client.

The method comprises the further steps to be performed in the first communication node 301, which steps can be perform in any suitable order:

Step 701

The first communication node 301 receives a message from the second communication node 302. The message comprises a communication window size of the second communication node 302.

The communication window size may indicate a maximum number of outstanding messages to be received in the first communication node 301 or the second communication node 302.

The message may be appended to a control message.

The message may be a dedicated message for communication window size.

The message may be one of a Gx request, a Rx Request, a Gy request, a Gxa request, a Gxc request, a SWa request, a SWx request, and a S6a/S6b/S6d request.

The communication between the first communication node 301 and the second communication node 302 may be performed via a third communication node 305. The third communication node 305 may be a forwarding agent configured to forward control messages message comprising communication window size between the first communication node 301 and second communication node 302.

Step 702

The communication window size of the second communication node 302 is stored in the first communication node 301.

Step 703

The first communication node 301 obtains its own communication window size.

Step 704

The first communication node 301 transmits a message to the second communication node 302. The message comprises the obtained communication window size of the second communication node 302.

Step 705

This is an optional step. The first communication node 301 may receive a trigger to transmit a message to the second communication node 302. The trigger may comprise a priority classification of the message to be sent to the second communication node 302.

Step 706

This is an optional step. The message may be placed in a priority queue based on the priority classification.

Step 707

This is an optional step. The first communication node 301 may check if the communication window size of the second communication node 302 is exceeded.

Step 708

This is an optional step. The first communication node 301 may transmit the message to the second communication node 302 if the communication window size is not exceeded and in accordance with the priority classification.

Figure 8:
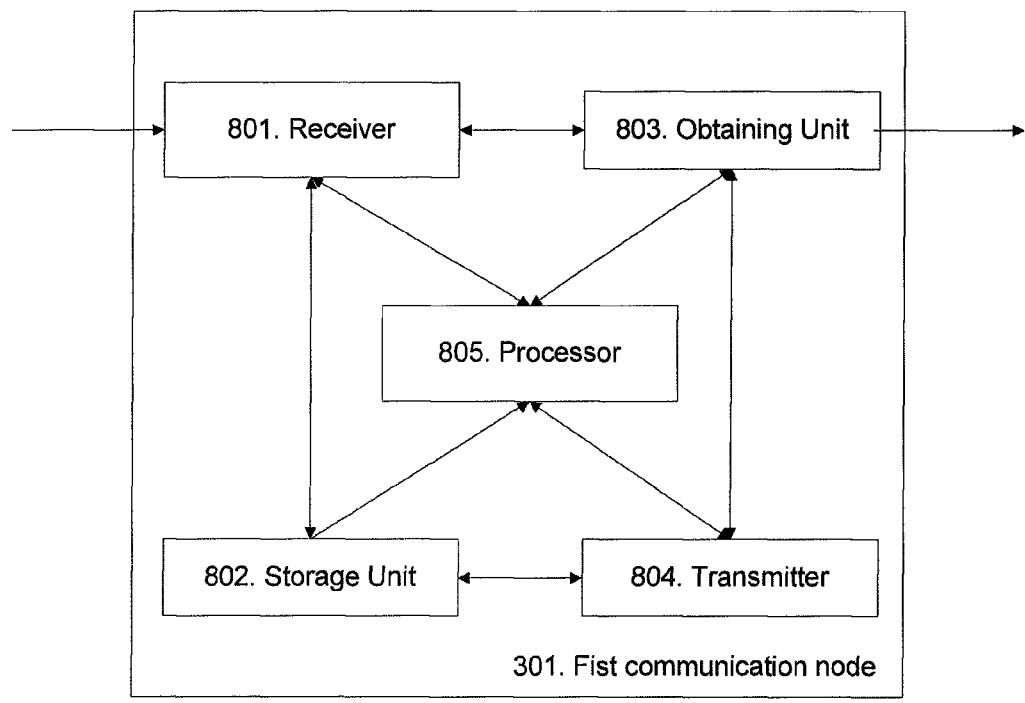
FIG. 8 is a schematic block diagram illustrating embodiments of a first communication node.

To perform the method steps shown in FIG. 7 for rate adaptation of communication between the first communication node 301 and at least one second communication node 302, the first communication node 301 comprises a first communication node arrangement as shown in FIG. 8. The first communication node 301 is arranged to configure a rate adaptation of communication between the first communication node 301 and at least one second communication node 302. The first communication node 301 and the at least one second communication node 302 is comprised in a communication network 300. The communication between the first communication node 301 and the second communication node 302 may be based on an AAA-protocol.

The communication between the first communication node 301 and the second communication node 302 may be performed via a third communication node 305. The third communication node 305 may be a forwarding agent configured to forward control messages message comprising communication window size between the first communication node 301 and second communication node 302. The first communication node 301 may be a server and the at least one second communication node 302 may be a client, or the second communication node 302 may be a server and the at least one first communication node 301 may be a client.

The first communication node 301 comprises a receiver 801 which is configured to receive a message from the second communication node 302. The message comprises a communication window size of the second communication node 302. The communication window size may indicate a maximum number of outstanding messages to be received in the first communication node 301 or the second communication node 302. The message may be appended to a control message, or the message may be a dedicated message for communication window size. The receiver 801 may be further configured to receive a trigger to transmit a message to the second communication node 302. The trigger may comprise a priority classification of the message to be sent to the second communication node 302. The message may be one of a Gx request, a Rx Request, a Gy request, a Gxa request, a Gxc request, a SWa request, a SWx request, and a S6a/S6b/S6d request. A person skilled in the art would realise that other protocols may also be applicable.

The first communication node 301 also comprises a storage unit 802 configured to store the communication window size of the second communication node 302.

An obtaining unit 803 is also comprised in the first communication node 301. The obtaining unit 803 is configured to obtain the communication window size of the first communication node 301.

Further, the first communication node 301 comprises a transmitter 804 configured to transmit a message to the second communication node 302. The message comprises the obtained communication window size of the first communication node 302. The transmitter 804 may be further configured to transmit the message to the second communication node 302 if the communication window size is not exceeded and in accordance with the priority classification.

The first communication node 301 may comprise a placing unit configured to place the message in a priority queue based on the priority classification. The first communication node 301 may also comprise a checking unit which is arranged to check if the communication window size of the second communication node 302 is exceeded.

Figure 10:
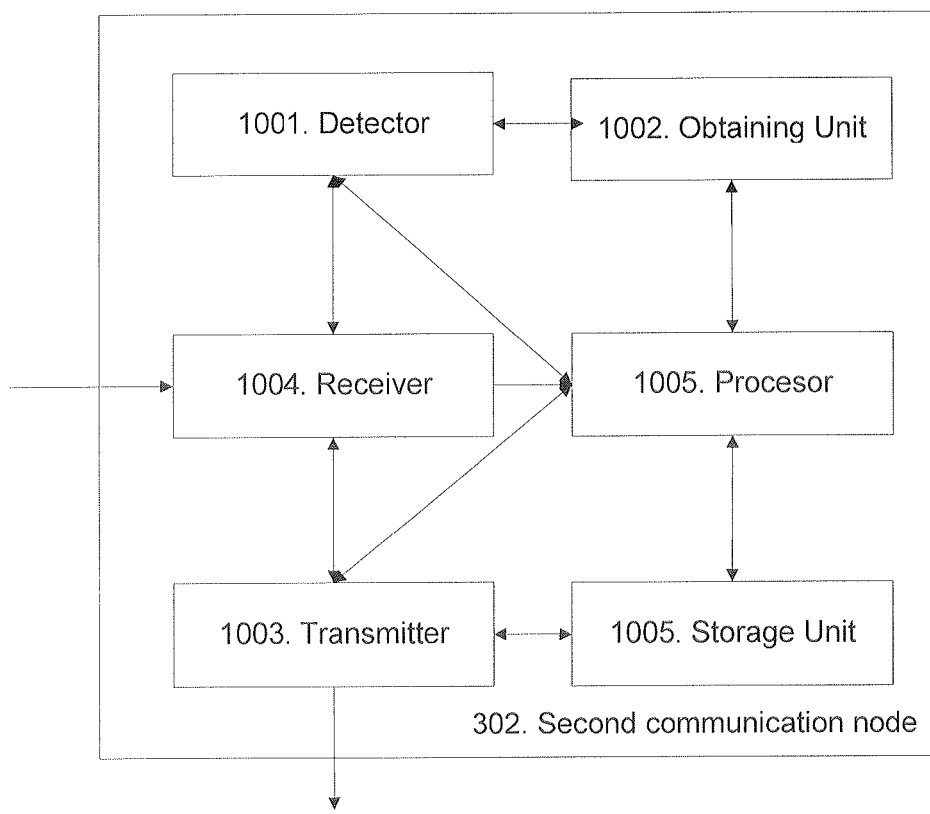
FIG. 10 is a schematic block diagram illustrating embodiments of a second communication node.

The method described above will now be described seen from the perspective of a second communication node 302. FIG. 10 is a flowchart describing the present method in the second communication node 302, for rate adaptation of communication between the second communication node 302 and at least one first communication node 301. The communication between the first communication node 301 and the second communication node 302 may be based on an AAA-protocol. The first communication node 301 and the at least one second communication node 302 being comprised in a communication network 300.

The communication between the first communication node 301 and the second communication node 302 may be performed via a third communication node 305. The third communication node 305 may be a forwarding agent 305 configured to forward control messages message comprising communication window size between the first communication node 301 and the second communication node 302.

The first communication node 301 may be a server and the at least one second communication node 302 may be a client, or the second communication node 302 may be a server and the at least one first communication node 301 may be a client.

The method comprises the further steps to be performed in the first communication node 301, which steps can be perform in any suitable order:

Step 902

The second communication node 302 detects a trigger to send a message to the first communication node 301. The message comprises a communication window size of the second communication node 302.

Step 902

The second communication node 302 obtains the communication window size of the second communication node 302, i.e. its own communication window size.

Step 903

The second communication node 302 transmits the message to the first communication node 301. The message comprises the communication window size of the second communication node 302.

Step 904

The second communication node receives a message from the first communication node 301. The received message comprises the communication window size of the first communication node 301.

Step 910

The second communication node 302 stores the received communication window size of the first communication node 301.

Figure 9:
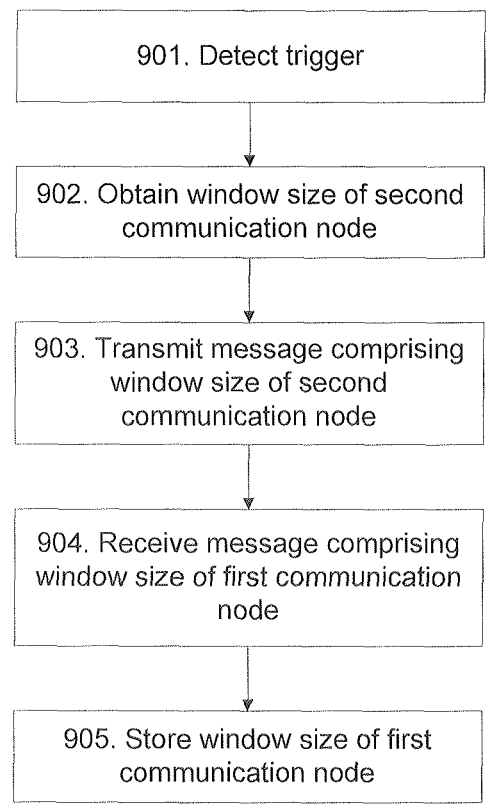
FIG. 9 is a flowchart depicting embodiments of a method in a communication network.

To perform the method steps shown in FIG. 9 for rate adaptation of communication between the first communication node 301 and at least one second communication node 302, the second communication node 302 comprises an second communication node arrangement as shown in FIG. 10. The second communication node 302 is arranged to configure a rate adaptation of communication between the first communication node and at least one second communication node 302. The first communication node 301 and the at least one second communication node 302 is comprised in a communication network 300. The communication between the first communication node 301 and the second communication node 302 may be based on an AAA-protocol. The communication between the first communication node 301 and the second communication node 302 may be performed via a third communication node 305. The third communication node 305 may be a forwarding agent configured to forward control messages message comprising communication window size between the first communication node 301 and second communication node 302. The first communication node 301 may be a server and the at least one second communication node 302 may be a client, or the second communication node 302 may be a server and the at least one first communication node 301 may be a client.

The second communication node 302 comprises a detector 1001 configured to detect a trigger to send a message to the first communication node 301. The message comprises a communication window size of the second communication node 302.

The second communication node 302 further comprises an obtaining unit 1002 configured to obtain the communication window size of the second communication node 302.

Even further, the second communication node 302 comprises a transmitter 1003 which is configured to transmit the message to the first communication node 301. The message comprises the communication window size of the second communication node 302.

The second communication node comprises a receiver 1004 configured to receive a message from the first communication node 301. The received message comprises the communication window size of the first communication node 301.

The second communication node 302 also comprises a storage unit 1005 configured to store the received communication window size of the first communication node 301.

The present mechanism for handling rate adaptation may be implemented through one or more processors, such as a processor 805 in the first communication node 301 depicted in FIG. 8, and/or such as a processor 1005 in the second communication node 302 depicted in FIG. 10, together with computer program code for performing the functions of the present solution. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the first communication node 301 and/or the second communication ode 302. One such carrier may be in the form of a CD ROM disc. It is however feasible with other data carriers such as a memory stick. The computer program code may furthermore be provided as pure program code on a server and downloaded to the first communication node 301 and/or the second communication node 302.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method in a first communication node for rate adaptation of communication between the first communication node and at least one second communication node, wherein the communication between the first communication node and the second communication node is based on an Access, Authorization, and Accounting "AAA" protocol and is performed via a third communication node, the first communication node, the at least one second communication node, and the third communication node being comprised in a communication network, the method comprising:

receiving a first message from the second communication node via the third communication node, the message comprising a second communication window size of the second communication node indicating a maximum number of outstanding AAA application messages to be safely transmitted to the second communication node without congesting the second communication node for rate adaptation of communication between the first communication node and the second communication node;

storing the second communication window size of the second communication node;

obtaining a first communication window size of the first communication node indicating a maximum number of outstanding AAA application messages to be safely received in the first communication node without congesting the first communication node;

transmitting a second message to the second communication node, the message comprising the obtained first communication window size of the first communication node;

receiving a trigger to transmit a third message to the second communication node, the trigger comprising a priority classification of the third message to be sent to the second communication node;

placing the third message in a priority queue based on the priority classification;

checking if the second communication window size of the second communication node is exceeded; and upon determining that the second communication window size of the second communication node is not exceeded, transmitting the third message to the second communication node wherein the third message is transmitted in accordance with the priority classification.

2. The method according claim 1, wherein the first message received from the second communication node is appended to a control message.

3. The method according to claim 1, wherein the first message received from the second communication node is a dedicated message for the second communication window size.

4. The method according to claim 1, wherein the third communication node being a forwarding agent configured to forward control messages comprising one of the first communication window size and the second communication window size between the first communication node and second communication node.

5. The method according to claim 1, wherein the first message and the second message is each one of a Gx request, a Rx Request, a Gy request, a Gxa request, a Gxc request, a SWa request, a SWx request, and a S6a/S6b/S6d request.

6. The method according to claim 1, wherein the first communication node is a server and the at least one second communication node is a client or wherein the second communication node is a server and the at least one first communication node is a client.

7. A method in a second communication node for rate adaptation of communication between the second communication node and at least one first communication node, wherein the communication between the first communication node and the second communication node is based on an Access, Authorization, and Accounting "AAA" protocol and is performed via a third communication node, the first communication node, the second communication node, and the third communication node being comprised in a communication network, the method comprising:

detecting a trigger to send a first message to the first communication node via the third communication node, the first message comprising a second communication window size of the second communication node, wherein the second communication window size indicates a maximum number of outstanding AAA application messages to be safely received from the first communication node without congesting the second communication node for rate adaptation of communication between the second communication node and the first communication node;

obtaining the second communication window size of the second communication node;

transmitting the first message to the first communication node, the message comprising the second communication window size of the second communication node;

receiving a second message from the first communication node, the received second message comprising the first communication window size of the first communication node, wherein the first communication window size indicates a maximum number of outstanding AAA application messages to be safely transmitted to the first communication node without congesting the first communication node; and storing the received first communication window size of the first communication node; and receiving a third message from the first communication node if the second communication window size of the second communication node is not exceeded, wherein the third message is received in accordance with a priority classification.

8. The method according to claim 7, the third communication node being a forwarding agent configured to forward control messages comprising one of the first communication window size and the second communication window size between the first communication node and the second communication node.

9. A first communication node for rate adaptation of communication between the first communication node and at least one second communication node, wherein the communication between the first communication node and the second communication node is based on an Access, Authorization, and Accounting "AAA" protocol and is performed via a third communication node, the first communication node, the at least one second communication node, and the third communication node being comprised in a communication network, the first communication node comprising:

a processor;

a storage unit coupled to said processor;

one or more non-transitory computer memories coupled to said processor storing computer program code executable by said processor configured to:

receive a first message from the second communication node via the third communication node, the first message comprising a second communication window size of the second communication node indicating a maximum number of outstanding AAA application messages to be safely transmitted to the second communication node without congesting the second communication node for rate adaptation of communication between the first communication node and the second communication node;

store the second communication window size of the second communication node in said storage unit;

obtain a first communication window size of the first communication node indicating a maximum number of outstanding AAA application messages to be safely received in the first communication node without congesting the first communication node;

transmit a second message to the second communication node, the second message comprising the obtained first communication window size of the first communication node;

receive a trigger to transmit a third message to the second communication node, the trigger comprising a priority classification of the third message to be sent to the second communication node;

place the third message in a priority queue based on the priority classification;

check if the second communication window size of the second communication node is exceeded; and upon determining that the second communication window size of the second communication node is not exceeded, transmit the third message to the second communication node, wherein the third message is transmitted in accordance with the priority classification.

10. A second communication node for rate adaptation of communication between the second communication node and at least one first communication node, wherein the communication between the first communication node and the second communication node is based on an Access, Authorization, and Accounting "AAA" protocol and is performed via a third communication node, the first communication node, the second communication node, and the third communication node being comprised in a communication network, the second communication node comprises:

a processor;

a storage unit coupled to said processor;

one or more non-transitory computer memories coupled to said processor storing computer program code executable by said processor configured to:

detect a trigger to send a first message to the first communication node via the third communication node, the first message comprising a second communication window size of the second communication node, wherein the second communication window size indicates a maximum number of outstanding AAA application messages to be safely received from the first communication node without congesting the second communication node for rate adaptation of communication between the second communication node and the first communication node;

obtain the second communication window size of the second communication node;

transmit the first message to the first communication node, the message comprising the second communication window size of the second communication node;

receive a second message from the first communication node, the received message comprising the first communication window size of the first communication node, wherein the first communication window size indicates a maximum number of outstanding AAA application messages to be safely transmitted to the first communication node without congesting the first communication node; and store the received first communication window size of the first communication node in said storage unit; and receive a third message from the first communication node if the second communication window size of the second communication node is not exceeded, wherein the third message is received in accordance with a priority classification.

11. The method of claim 1, wherein the first communication node comprises a server, the second communication node comprises a client, and the third communication node comprises one of a proxy agent and a relay agent.

12. The method of claim 11, wherein the client comprises one of a Policy Control and Charging Enforcement Function (PCEF), a Gateway GPRS Support Node (GGSN), a Bearer Binding and Event Reporting Function (BBERF) and a Packet Data Network-Gateway (PDN-GW), and the server comprises one of a Policy and Charging Rules Function (PCRF) and an Online Charging System (OCS).

* * * * *